F. G. FARR.
HYDRAULIC OIL STORAGE AND DELIVERY SYSTEM.
APPLICATION FILED JAN. 19, 1918.

1,286,974.   Patented Dec. 10, 1918.

Frederick G. Farr, Inventor

By Whittemore Hulbert + Whittemore
Attorneys

UNITED STATES PATENT OFFICE.

FREDERICK G. FARR, OF DETROIT, MICHIGAN, ASSIGNOR TO HYDRAULIC OIL SYSTEMS CORPORATION, OF DETROIT, MICHIGAN, A CORPORATION OF MICHIGAN.

HYDRAULIC OIL STORAGE AND DELIVERY SYSTEM.

1,286,974.　　　　Specification of Letters Patent.　　Patented Dec. 10, 1918.

Application filed January 19, 1918.　Serial No. 212,625.

*To all whom it may concern:*

Be it known that I, FREDERICK G. FARR, a citizen of the United States of America, residing at Detroit, in the county of Wayne and State of Michigan, have invented certain new and useful Improvements in Hydraulic Oil Storage and Delivery Systems, of which the following is a specification, reference being had therein to the accompanying drawings.

The invention relates to hydraulic oil storage and delivery systems and has particular reference to a construction which may be applied to installed tanks which were originally designed for other systems. It is the object of the invention to prevent the displacement of oil into the drain when the tank is filled, and to this end the invention comprises the novel construction as hereinafter set forth.

A is the tank, B the oil delivery conduit connected therewith and C the fill conduit which may be connected to a tank, car or other source of supply. D is the conduit for the displacement liquid, which is controlled by a valve E which alternately connects the same to a high head connection F and drain connection G.

Figure 1:
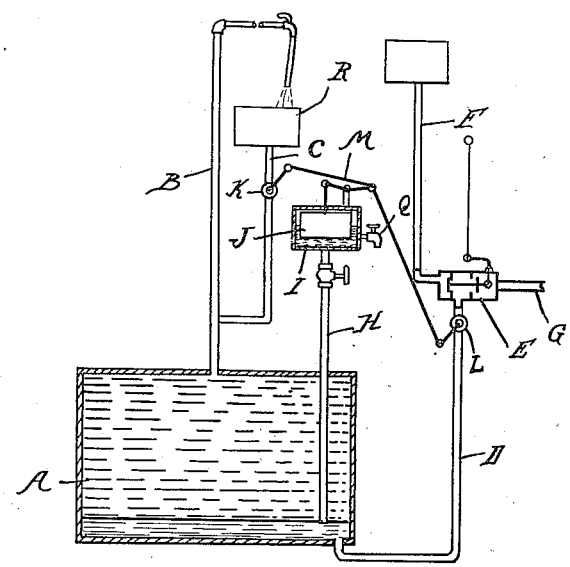
Figure 1 is a diagram showing my improved system.

In the construction and installation of tanks designed for hydraulic systems it is usual to place a trap in the displacement connection D, which extends sufficiently below the tank A to prevent any discharge of oil therethrough. Such a trap cannot, however, be conveniently attached to a tank already installed, and it is essential to provide other means for preventing displacement of oil into the sewer. With the present invention I have provided means operating either automatically to stop the movement of the fluids or as a tell-tale, warning the operator to stop further filling of the tank. Fig. 1 illustrates an automatic construction, in which H is a pipe extending into the tank A to near the bottom thereof and rising to a height above the water level when the tank is being filled but below the corresponding static oil level. At the upper end of the pipe H is a closed receptacle I, within which is arranged a float J or other means actuated by the rise of fluid in the receptacle. This float is adapted to operate mechanism for closing a valve in either the oil fill pipe or the water discharge pipe, or it may operate both valves. As shown, K is a valve in the oil filling pipe C, and L is a valve in the water pipe D, these valves being connected to a lever mechanism M which is actuated by the float J.

With the construction just described in operation, when the tank is being filled, the fill pipe C is connected with a source of supply, such as a tank R or wagon, and the valves K and L being opened, the oil is permitted to flow into the tank and to displace the water through the pipe D and valve E into the waste connection G. This filling continues until the level of the oil within the tank drops below the lower end of the pipe H, whereupon the water with which said pipe is filled will drop out, being replaced by oil. The oil, being of lighter specific gravity, will rise in the receptacle I and will lift the float J, which, operating through the mechanism M, will close both or either of the valves K and L. This will prevent further admission of oil into the tank and therefore will avoid forcing oil into the pipe D and into the sewer. It is obvious that the closing of either one of the valves K and L by this mechanism would produce a similar effect, as the valve K would directly prevent the oil from entering while the valve L would prevent the displacement of the water. However, the arrangement of the two valves is preferable as giving double security.

Figure 2:
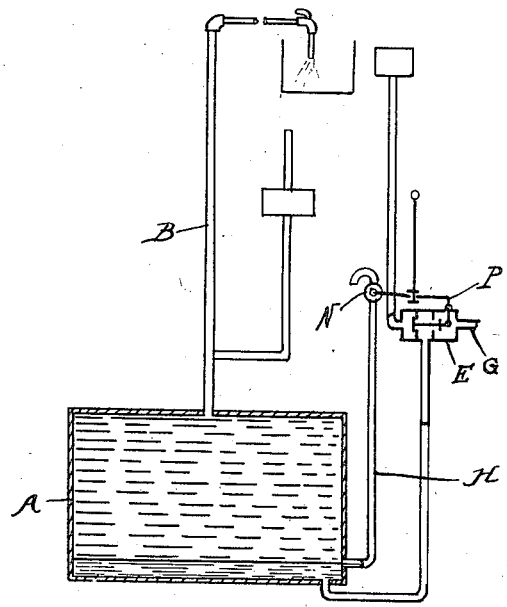
Fig. 2 is a similar view showing a modified construction.

With the construction as shown in Fig. 2, in place of the automatic mechanism the pipe H is open at its upper end, so that whenever oil rises therein it will be discharged and will call the attention of the operator to the fact that the tank is nearly full. Furthermore, since the lower end of said pipe H is above that of the pipe D, any discharge of oil into the drain will be prevented. To prevent a discharge from the pipe H when the system is operated to deliver oil a valve N is placed in said pipe H, and this valve is interconnected with the actuating handle P for the valve E, so that the valve N will be opened whenever the valve E is adjusted to open the drain, and the valve N will be closed whenever the valve is adjusted to close the drain and place the high water head upon the tank.

With the apparatus as shown in Fig. 1, whenever oil has risen through the conduit H into the receptacle I and operated the float the valve or valves will be in closed position. To restore these valves to open position oil must be drawn off, which can be accomplished through a suitable draw-off cock Q.

What I claim as my invention is:

1. In a system for the hydraulic storage and delivery of oil, the combination with a tank, a connection for filling the same and a water displacement connection, of a shut-off valve in one of said connections, a conduit rising from said tank having its lower end open and at a predetermined level, the upper end of said conduit being above the hydrostatic level of the water when the tank is being filled but below the corresponding level of the oil, and means operated by the rise of oil in said conduit for closing said valve.

2. In a system for the hydraulic storage and delivery of oil, the combination with a tank, a fill connection therefor and water discharge connection, of a valve in said fill connection, a conduit connecting with said tank and rising from a predetermined level to a point above the hydrostatic level of the water during filling of the tank but below the corresponding level of the oil, and means actuated by the rise of oil in said conduit for closing said valve.

3. In a system for the hydraulic storage and delivery of oil, the combination with a tank, a connection for filling the same and a water discharge connection, of a valve in each of said connections, a conduit in open connection with said tank at a predetermined level and rising to a point above the hydrostatic level of the water when the tank is being filled but below the corresponding level of oil, and means actuated by the rise of oil in said conduit for closing both of said valves.

4. In a system for the hydraulic storage and delivery of oil, the combination with a tank, a connection for filling the same and a water discharge connection, of a valve in one of said connections, a conduit in open connection with the tank at a predetermined level and rising to a point above the hydrostatic level of water when the tank is being filled but below the corresponding level of the oil, a receptacle connected with the upper end of said conduit, a float in said receptacle, and mechanism actuated by the rise of said float for operating said valve.

5. In a system for the hydraulic storage and delivery of oil, the combination with a tank, a connection for filling the same and a water discharge connection, of a valve in one of said connections, a conduit in open connection with the tank at a predetermined level and rising to a point above the hydrostatic level of water when the tank is being filled but below the corresponding level of the oil, a receptacle connected with the upper end of said conduit, a float in said receptacle, mechanism actuated by the rise of said float for operating said valve, and means for drawing off oil from said receptacle to permit the dropping of the float and the opening of the valve.

6. In a system for the hydraulic storage and delivery of oil, the combination with a tank, a connection for filling the same and a water discharge connection, of a valve in each of said connections, and means for automatically closing both of said valves when the oil contents of the tank reach a certain maximum.

In testimony whereof I affix my signature.

FREDERICK G. FARR.